United States Patent [19]

Ueda et al.

[11] Patent Number: 5,015,668

[45] Date of Patent: May 14, 1991

[54] RUBBER COMPOSITION CONTAINING A DEODORIZING COMPONENT

[75] Inventors: Tsunehisa Ueda, Zushi; Koji Miyazaki, Yokohama; Tadao Natsuume, Yokosuka, all of Japan

[73] Assignee: Nippon Zeon Co., Ltd., Tokyo, Japan

[21] Appl. No.: 489,865

[22] Filed: Mar. 5, 1990

Related U.S. Application Data

[63] Continuation of Ser. No. 242,424, Sep. 9, 1988, abandoned.

[30] Foreign Application Priority Data

Sep. 11, 1987 [JP] Japan .................................. 62-228053

[51] Int. Cl.$^5$ ........................... C08J 3/20; C08C 4/00; C08L 7/00; C08L 9/00
[52] U.S. Cl. ...................................... 523/102; 525/207
[58] Field of Search ...................... 525/207; 523/102

[56] References Cited

U.S. PATENT DOCUMENTS

| | | | |
|---|---|---|---|
| 2,328,251 | 8/1943 | MacDonald | 523/102 |
| 4,021,400 | 5/1977 | McKenna | 523/102 |
| 4,218,349 | 8/1980 | Minatono et al. | 525/207 |
| 4,374,236 | 2/1983 | Znaiden | 523/102 |
| 4,757,099 | 7/1988 | Hoshino et al. | 523/102 |
| 4,762,877 | 8/1988 | Heilbrunn | 525/207 |

FOREIGN PATENT DOCUMENTS

| | | | |
|---|---|---|---|
| 51-34252 | 3/1976 | Japan | 525/207 |
| 60-53547 | 3/1985 | Japan | 523/102 |
| 61-168670 | 7/1986 | Japan | 523/102 |

*Primary Examiner*—Allan M. Lieberman
*Attorney, Agent, or Firm*—Sherman and Shalloway

[57] ABSTRACT

A rubber composition comprising rubber and a deodorizing component containing a compound having an acid anhydride group in the molecule.

10 Claims, No Drawings

RUBBER COMPOSITION CONTAINING A DEODORIZING COMPONENT

This application is a continuation of application Ser. No. 07/242,424 filed Sept. 9, 1988, now abandoned.

This invention relates to a rubber composition. More specifically, it relates to a rubber composition which has excellent deodorizing property and is odorless.

It has been the practice in the processing and molding of rubber to incorporate various chemicals including a vulcanizer, a crosslinking agent, a vulcanization accelerator, an antioxidant, an aging resistor, a plasticizer, a blowing agent, a lubricant and a fire retardant. Some of these chemicals, however, are malodorous. Some others decompose to give off offensive odors during use. For example, polyamine-type crosslinking agents such as hexamethylene diamine, hexamethylene tetramine, tetraethylene pentamine and hexamethylene diamine carbamate have an amine smell. Ammonium carbonate used as a blowing agent generates ammonia when decomposed. Hexamine, a decomposition residue of dinitrosopentamethylene tetramine also used as a blowing agent gives off an amine smell. It has been desired to reduce these offensive odors in order to improve the working environment. Furthermore, with the recent increase in the standards of living, various offensive odors in the living environment raise a problem, and the odors of rubber products used in various applications have been desired to be reduced or removed. Attempts have also been made to impart a deodorizing function to the rubber products themselves. No satisfactory result, however, has yet been obtained.

We have now found that by incorporating a deodorizing component containing a compound having an acid anhydride group in the molecule in rubber, the offensive odors of various rubber compounding chemicals are reduced during processing and molding of rubber, and that the resulting rubber composition itself is odorless and has a deodorizing function.

Thus, according to this invention, there is provided a rubber composition comprising rubber and a deodorizing component containing a compound having an acid anhydride group in the molecule.

The compound having an acid anhydride group in the molecule used in this invention may be any compound having a partial structure of the general formula

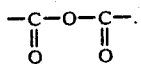

Specific examples include aromatic polycarboxylic acid anhydrides such as phthalic anhydride, pyromellitic anhydride and trimellitic anhydride; aromatic monocarboxylic acid anhydrides such as benzoic anhydride; linear or alicyclic aliphatic polycarboxylic acid anhydrides such as succinic anhydride, methylsuccinic anhydride, glutaric anhydride, maleic anhydride, citraconic anhydride, 1,2-cyclohexenedicarboxylic anhydride, 3-methyl-1,2-cyclohexenedicarboxylic anhydride, 1,2-cyclohexanedicarboxylic anhydride and acrylic acid-type polymers having an acid anhydride crosslinkage (e.g., polyacrylic anhydride); linear or alicyclic aliphatic monocarboxylic anhydrides such as butyric anhydride, propionic anhydride, lauric anhydride and cyclohexanecarboxylic anhydride; alpha,beta-unsaturated dicarboxylic anhydride-type polymers; and Diels-Alder reaction-type adducts between alpha,beta-unsaturated dicarboxylic acid anhydrides and olefins, and derivatives of the adducts.

The acrylic acid-type polymers having an acid anhydride crosslinkage used in this invention may be any of acrylic acid-type polymers in which an acid anhydride group structure is formed in the same molecule or between different molecules, and may be obtained, for example, by dehydration reaction under heat between two carboxyl groups. These polymers, however, are not limited by the method of synthesis.

In the present invention, the acrylic acid-type polymers denote homopolymers of alpha,beta-unsaturated carboxylic acids or copolymers of these with monomers copolymerizable with them. Examples of the alpha,beta-unsaturated carboxylic acids include acrylic acid, methacrylic acid, crotonic acid, itaconic acid and maleic acid. These examples, however, are not limiting. The monomers copolymerizable with alpha,beta-unsaturated carboxylic acids are also not limited in particular. Specific examples inlcude (meth)acrylic esters such as methyl methacrylate, ethyl acrylate, butyl methacrylate and 2-ethylhexyl acrylate; aromatic monoolefins such as styrene and alpha-methylstyrene; unsaturated nitriles such as acrylonitrile and methacrylonitrile; vinyl carboxylates such as vinyl acetate and vinyl caproate; aliphatic diolefins such as butadiene and isoprene; and unsaturated acid amides such as acrylamide and N-methylolacrylamide.

There is no particular limitation on the method of obtaining the acrylic acid-type polymers used in this invention, and known polymerization techniques such as emulsion polymerization and solution polymerization techniques may be applied.

There is no particular limitation on the amount of the acid anhydride groups contained in the acrylic acid-type copolymers having an acid anhydride linkage used in this invention. It is usually at least 1 mole %, preferably at least 5 mole %, based on the entire monomeric units constituting the acrylic acid-type polymer. If this amount is excessively small, the amount of the deodorizing component based on the rubber becomes too large, and, for example, the shape of a molded article of the resulting rubber composition becomes unsatisfactory.

The molecular weight of the acrylic acid-type polymer used in this invention is not particularly limited, but is usually 500 to 500,000, preferably 1,000 to 300,000.

Alpha,beta-unsaturated dicarboxylic acid anhydride-type polymers used in this invention denote the homopolymers of alpha,beta-unsaturated dicarboxylic acid anhydrides and copolymers of these with monomers copolymerizable with them.

Specific examples of the alpha,beta-unsaturated dicarboxylic acid anhydrides are maleic anhydride, itaconic anhydride and citraconic anhydride. Among them, maleic anhydride is preferred in view of reactivity and economy.

Specific examples of the monomers copolymerizable with the alpha,beta-unsaturated dicarboxylic acid anhydrides include aromatic monoolefins such as styrene, alpha-methylstyrene and vinyltoluene; aliphatic monoolefins such as ethylene, propylene, isobutene, 1-butene, 2-butene, 1-pentene, 2-pentene, 2-methyl-1-butene, 2-methyl-2-butene, 1-hexene, 2,2,4-trimethyl-1-pentene, 2,2,4-trimethyl-2-pentene, 1-decene and 1-octadecene; cyclic monoolefins such as cyclopentene, cyclohexene and cyclooctene; aliphatic diolefins such as butadiene, isoprene and piperylene; cyclic olefins such as cyclopentadiene; unsaturated carboxylic acids such as acrylic acid and methacrylic acid; unsaturated carboxylic acid esters such as ethyl acrylate and methyl methacrylate; unsaturated nitriles such as acrylonitirle and methacrylonitrile; vinyl halides such as vinyl chloride; vinyl carboxylates such as vinyl acetate; vinyl ethers such as methyl vinyl ether; and unsaturated sulfonic acids such as vinylsulfonic acid and p-styrenesulfonic acid.

There is no particular limitation on the method of obtaining alpha,beta-unsaturated dicarboxylic acid anhydride-type polymers used in this invention, and known polymerization methods such as emulsion and solution polymerization techniques may be applied.

There is also not any particular limitation to the amount of the alpha-beta-unsaturated dicarboxylic acid anhydride contained in the alpha,beta-unsaturated dicarboxylic acid anhydride-type polymers. Usually, it is at least 1 mole %, preferably at least 5 mole %, based on the total monomeric units constituting the alpha,beta-unsaturated dicarboxylic acid anhydride-type polymers. If it is excessively small, the amount of the deodorizing component based on the rubber becomes too large, and the shape of a molded product prepared from the rubber composition becomes unsatisfactory.

The molecular weight of the alpha,beta-unsaturated dicarboxylic acid anhydride-type polymer used in this invention is not particularly limited. It is usually 500 to 500,000, preferably 1,000 to 300,000.

The Diels-Alder reaction-type adduct used in this invention may be, for example, a product obtained by the Diels-Alder reaction of an alpha,beta-unsaturated dicarboxylic acid anhydride with a diolefin and a product of the ene reaction of an alpha,beta-unsaturated dicarboxylic acid anhydride with an olefin [the ene reaction is described in H. M. R. Hoffmann, Angew. Chem. Int. Ed. 8, 556 (1969)].

Specific examples of the alpha,beta-unsaturated dicarboxylic acid anhydride used in the Diels-Alder reaction-type addition reaction are maleic anhydride, itaconic anhydride and citraconic anhydride. Maleic anhydride is preferred because of its reactivity and economy.

The diolefin to be used in the Diels-Alder reaction with the alpha,beta-unsaturated dicarboxylic acid anhydride is not particularly limited. Its specific examples include aliphatic conjugated diolefins such as butadiene, isoprene and piperylene; aliphatic trienes such as 1,3,5-hexatriene; cyclic conjugated polyunsaturated olefins such as cyclopentadiene, 1,3-cyclohexadiene and cyclooctatetraene; and aromatic compounds such as styrene, indene and naphthalene. The diolefins described in M. C. Kloetzel et al., "Organic Reactions", vol. 4, pages 1-60 (John Wiley & Sons, Inc.) may also be cited as other examples of the diolefin.

The olefin to be used in the ene reaction with the alpha,beta-unsaturated dicarboxylic acid anhydride is not particularly limited. As its specific examples, there may be cited aliphatic monoolefins such as propylene, isobutene, 1-butene, 2-butene, 1-pentene, 2-pentene, 2-methyl-1-butene, 2-methyl-2-butene, 1-hexene, 2,2,4-trimethyl-1-pentene, 2,2,4-trimethyl-2-pentene, 1-decene, 1-octadecene, and alpha-olefins obtained by polymerizing lower monoolefins (e.g., ethylene or propylene) with Ziegler catalysts; cyclic monoolefins such as cyclopentene, cyclohexene and cyclooctene; aliphatic or cyclic non-conjugated diolefins such as 1,4-pentadiene and 1,4-cyclohexadiene; higher unsaturated fatty acids such as oleic acid; and polymers having an unsaturated bond such as polybutadiene.

The derivative of the aforesaid Diels-Alder reaction-type adduct used in this invention is not restricted by the method of synthesis. It may be of any structure derived from the Diels-Alder reaction-type adduct by known by reactions. Examples include hydrogenation products of the Diels-Alder reaction-type adducts of alpha,beta-unsaturated dicarboxylic acid anhydrides and olefins, and products obtained by partly converting the acid anhydride groups of the adducts into ester groups.

In the present invention, one or more of the compounds having an acid anhydride group in the molecule may be used in this invention.

Specific examples of the rubber used in this invention include natural rubber, styrene/butadiene rubber (SBR), butadiene rubber (BR), isoprene rubber (IR), ethylene/propylene/diene terpolymer (EPDM), nitrile/butadiene rubber (NBR), chloroprene rubber (CR), isobutene-isoprene rubber (IIR), polyether urethane rubber (EU), acrylic rubber (ACM), epichlorohydrin rubber (CO), and ethylene/vinyl acetate rubber (EAM).

The amount of the deodorizing component to be incorporated in the rubber is 0.05 to 3.0 parts by weight, preferably 0.1 to 2.0 parts by weight, per 100 parts by weight of the rubber. If the amount of the deodorizing component used is excessively small, the deodorizing function of the resulting composition is not sufficient. If it is too large, adverse effects will be exerted on the properties of the resulting composition or it is economically disadvantageous.

Ordinary rubber additives may be used in the rubber composition of this invention containing a deodorant component. Examples of the additives include vulcanization accelerators such as hexamethylene tetramine, n-butyraldehydeaniline, 1,3-diphenylguanidine, N,N'-diphenylthiourea and 2-mercapto-2-imidazoline; vulcanization coagents such as zinc flower and stearic acid; vulcanizing agents such as sulfur, organic peroxides, p-quinonedioxime and poly-p-dinitrobenzene; reinforcing agents such as carbon black, clay and calcium carbonate; inorganic blowing agents such as ammonium carbonate and sodium bicarbonate; organic blowing agents such as dinitrosopentamethylene tetramine, benzenesulfonyl hydrazide, p-toluenesulfonyl hydrazide and azodicarbonamide; softening agents; coloring agents; extenders; aging resistors; antiscorching agents; peptizing agents; and tackifiers.

The rubber composition of this invention may be processed into various rubber products in accordance with ordinary processing techniques.

Thus, the present invention provides a rubber composition which is odorless and has an excellent deodorizing function.

The following examples illustrate the present invention more specifically. All parts and percentages in the following Examples, Comparative Examples and Referential Examples are by weight unless otherwise specified.

REFERENTIAL EXAMPLE 1

A $C_{20-28}$ alpha-olefin mixture (DIALEN 208, a product of Mitsubishi Chemical Industries, Ltd.) was polymerized with an equimolar proportion of maleic anhydride in a customary manner to give an alternate copolymer (1) having a molecular weight of 12,000 in which the alpha-olefin/maleic anhydride was nearly equimolar.

REFERENTIAL EXAMPLE 2

An alternate copolymer (2) having a molecular weight of 10,500 in which the constituent components were nearly equimolar was obtained by repeating Referential Example 1 except that a $C_{30-40}$ alpha-olefin mixture (DIALENE 30, a product of Mitsubishi Chemical Industries, Ltd.) was used instead of the $C_{20-28}$ alpha-olefin mixture.

REFERENTIAL EXAMPLE 3

The copolymer (2) obtained in Referential Example 2 was esterified in a customary manner to obtain a copolymer (3) in which 10 mole % of the maleic anhydride units were converted to ethyl ester units.

REFERENTIAL EXAMPLE 4

A $C_{16-18}$ alpha-olefin mixture (DIALEN 168, a product of Mitsubishi Chemical Industries, Ltd.) and an equimolar proportion of maleic anhydride were subjected to addition-reaction in the presence of a polymerization inhibitor at 200° C. for 15 hours in an autoclave. The unreacted alpha-olefins were removed under reduced pressure to give an ene reaction product (1) (melting point 43° C.; saponification value 312 KOH mg/g).

REFERENTIAL EXAMPLE 5

An ene reaction product (2) (melting point 52° C., saponification value 222 KOH mg/g) was obtained in the same way as in Referential Example 4 except that a $C_{20-28}$ alpha-olefin mixture (DIALENE 208, a product of Mitsubishi Chemical Industries, Ltd.) was used instead of the $C_{16-18}$ alpha-olefin mixture.

EXAMPLE 1

In each run, a rubber compound of the recipe shown in Table 1 was prepared, and foamed and vulcanized to give a foamed sponge. The odor of the sponge was examined by the following standards, and the results are shown in Table 2.

X: The odor of the composition products of the blowing agent was strong (the level of the blank).

Δ: The odor was slightly reduced as compared with the level of the blank.

O: The odor was reduced as compared with the level of the blank; and a clear effect was obtained.

TABLE 1

| Ingredient | Parts |
| --- | --- |
| Isoprene rubber (Nipol IR 2200, a product of Nippon Zeon Co., Ltd.) | 100 |
| Zinc flower | 5 |
| Stearic acid | 1 |
| Light calcium carbonate | 25 |
| Spindle oil | 15 |
| Carbon black (SRF grade carbon) | 1 |
| Sulfur | 3 |
| Vulcanization accelerator (CZ: N-cyclohexyl-2-benzothiazolyl sulfenamide) | 0.8 |
| Blowing agent (dinitrosopentamethylene tetramine, CELLMIC A, a product of Sankyo Kasei Co., Ltd.) | 6 |
| Blowing aid (salicylic acid produced by Yoshitomi Pharmaceutical Co., Ltd.) | 2 |
| Deodorizing component | 0.05–2.0 |

TABLE 2

| | Deodorizing component | Amount of the deodorizing component (parts) | Expansion ratio | Odor of the foamed sponge |
| --- | --- | --- | --- | --- |
| Invention | Copolymer (1) | 0.05 | 4.6 | Δ |
| | " | 1.0 | 4.2 | O |
| | " | 2.0 | 4.6 | O |
| | Copolymer (2) | 1.0 | 4.6 | O |
| | Copolymer (3) | 1.0 | 4.2 | O |
| | Maleic anhydride polymer (MW1200) | 1.0 | 4.2 | O |
| | Ene reaction product (1) | 1.0 | 4.3 | O |
| | Ene reaction product (2) | 1.0 | 4.2 | O |
| | 3-methyl-$\Delta^4$-tetrahydrophthalic anhydride | 1.0 | 4.5 | O |
| | Lauric anhydride | 1.0 | 4.1 | O |
| | Succinic anhydride | 1.0 | 4.0 | O |
| | Phthalic anhydride | 0.05 | 4.5 | Δ |
| | " | 1.0 | 4.1 | O |
| | " | 2.0 | 4.3 | O |
| | Trimellitic anhydride | 1.0 | 4.2 | O |
| | Pyromellitic anhydride | 1.0 | 4.1 | O |
| Comparison | Not added | 0.0 | 4.2 | X |
| | Citric acid | 1.0 | 3.8 | Δ |
| | Ferrous sulfate/L-ascorbic acid (*) | 1.0 | 3.4 | Δ |

(*) $FeSO_4 \cdot 7H_2O$/L-ascorbic acid (mixed in a mole ratio of 1/0.05)

The results given in Table 2 demonstrate that foamed sponges having a good expansion ratio and being odorless can be obtained from the rubber compositions of this invention containing deodorizing components.

EXAMPLE 2

In each run, a rubber compound of the recipe shown in Table 2 was prepared, foamed and vulcanized to give a foamed sponge. Its odor was examined on the same standards as in Example 1. The results are shown in Table 4.

TABLE 3

| Ingredient | Parts |
| --- | --- |
| Natural rubber (RSS#1) | 50 |
| Styrene butadiene rubber (Nipol 1778J, a product of Nippon Zeon Co., Ltd.) | 30 |
| High styrene/butadiene rubber (Nipol 2057S, a product of Nippon Zeon Co., Ltd.) | 20 |
| Zinc flower | 5 |
| Stearic acid | 2 |
| Sulfur | 2.5 |
| Hard clay | 40 |

TABLE 3-continued

| Ingredient | Parts |
| --- | --- |
| Heavy calcium carbonate | 60 |
| Hydrous silicic acid | 10 |
| Naphthenic oil | 15 |
| Ethylene glycol | 0.5 |
| Blowing agent (dinitrosopentamethylene tetramine, CELLMIC A, a product of Sankyo Kasei Co., Ltd.) | 6 |
| Blowing aid (urea type) | 6 |
| Coumarone-indene resin | 3 |
| Vulcanization accelerator (MBTS: dibenzothiazyl disulfide) | 1.2 |
| Deodorizing component | 0.05–2.0 | of the resulting sheet was examined by the following method, and the results are shown in Table 6.

Ammonia Deodorizing Test

One gram of each sample was put in a 150 ml glass ampoule having a crown cap. After the inside of the ampoule was replaced by air containing 10,000 ppm of ammonia, the ampoule was sealed up. After a predetermined period of time, the amount of ammonia in the ampoule was measured by gas chromatography, and the deodorizing rate was calculated.

TABLE 4

| | Deodorizing component | Amount of the deodorizing component (parts) | Expansion ratio | Odor of the foamed sponge |
| --- | --- | --- | --- | --- |
| Invention | Copolymer (1) | 0.05 | 8.4 | Δ |
| | " | 1.0 | 8.0 | O |
| | " | 2.0 | 8.4 | O |
| | Copolymer (2) | 1.0 | 8.4 | O |
| | Copolymer (3) | 1.0 | 8.2 | O |
| | Maleic anhydride polymer (MW1200) | 1.0 | 8.2 | O |
| | Ene reaction product (1) | 1.0 | 8.0 | O |
| | Ene reaction product (2) | 1.0 | 8.1 | O |
| | 3-methyl-$\Delta^4$-tetrahydrophthalic anhydride | 1.0 | 8.2 | O |
| | Lauric anhydride | 1.0 | 8.1 | O |
| | Succinic anhydride | 1.0 | 8.0 | O |
| | Phthalic anhydride | 0.05 | 8.3 | Δ |
| | " | 1.0 | 8.1 | O |
| | " | 2.0 | 8.3 | O |
| | Trimellitic anhydride | 1.0 | 8.1 | O |
| | Pyromellitic anhydride | 1.0 | 8.2 | O |
| Comparison | Not added | 0.0 | 8.2 | X |
| | Citric acid | 1.0 | 7.9 | Δ |
| | Ferrous sulfate/L-ascorbic acid (*) | 1.0 | 3.1 | Δ |

(*) Same as shown in Table 2.

The results of Table 4 show that for different types of rubber, the resulting sponge had a good expansion ratio and was odorless.

EXAMPLE 3

In each run, a rubber compound of the recipe shown in Table 5 was prepared and vulcanized to form a rubber sheet (100×100×2 mm³). The deodorizing ability

TABLE 5

| Ingredients | Parts |
| --- | --- |
| NBR (DN 300, a product of Nippon Zeon Co., Ltd.) | 100 |
| Zinc flower | 5 |
| Stearic acid | 1 |
| Carbon black (SRF grade carbon) | 60 |
| DOP (dioctyl phthalate) | 5 |
| Sulfur | 0.5 |
| Accelerator TT (tetramethylthiuram disulfide) | 1.5 |
| Accelerator CZ | 1.5 |
| Deodorizing component | 0.05–2.0 |

TABLE 6

| | Deodorizing component | Amount of the deodorizing component (parts) | Ammonia deodorizing rate (%) | | |
| --- | --- | --- | --- | --- | --- |
| | | | 1 hour later | 5 hours later | 24 hours later |
| Invention | Copolymer (1) | 0.05 | 2 | 7 | 17 |
| | " | 1.0 | 5 | 19 | 45 |
| | " | 2.0 | 9 | 21 | 51 |
| | Copolymer (2) | 1.0 | 7 | 17 | 45 |
| | Copolymer (3) | 1.0 | 5 | 12 | 41 |
| | Maleic anhydride polymer (MW1200) | 1.0 | 5 | 15 | 42 |
| | Ene reaction product (1) | 1.0 | 8 | 20 | 50 |
| | Ene reaction product (2) | 1.0 | 7 | 17 | 48 |
| | 3-methyl-$\Delta^4$-tetrahydrophthalic anhydride | 1.0 | 5 | 12 | 45 |
| | Lauric anhydride | 1.0 | 4 | 11 | 38 |
| | Succinic anhydride | 1.0 | 5 | 12 | 35 |
| | Phthalic anhydride | 0.05 | 2 | 6 | 15 |
| | " | 1.0 | 6 | 16 | 47 |
| | " | 2.0 | 10 | 23 | 52 |
| | Trimellitic anhydride | 1.0 | 5 | 12 | 40 |
| | Pyromellitic anhydride | 1.0 | 6 | 15 | 49 |
| Comparison | Not added | 0.0 | 0 | 0 | 0 |
| | Citric acid | 1.0 | 2 | 5 | 7 |

TABLE 6-continued

| Deodorizing component | Amount of the deodorizing component (parts) | Ammonia deodorizing rate (%) | | |
|---|---|---|---|---|
| | | 1 hour later | 5 hours later | 24 hours later |
| Ferrous sulfate/L-ascorbic acid (*) | 1.0 | 3 | 8 | 25 |

(*) Same as shown in Table 2.

The results of Table 6 show that the compositions of this invention containing deodorizing components have excellent deodorizing properties.

We claim:

1. A rubber composition comprising 100 parts by weight of rubber and 0.05 to 3.0 parts by weight of a compound having at least 1 mole % of an acid anhydride group in the molecule as a deodorizing active component characterized in that said compound having an acid anhydride group in the molecule is selected from the group consisting of (1) an alpha,beta-unsaturated dicarboxylic acid anhydride polymer selected from the group consisting of (a) a homopolymer of an alpha,beta-unsaturated dicarboxylic acid anhydride and (b) a copolymer of an alpha,beta-unsaturated dicarboxylic acid anhydride and a copolymerizable monomer selected from the group consisting of an aromatic monoolefin, an alpha-olefin having at least 10 carbon atoms, unsaturated carboxylic acid esters, unsaturated nitriles, vinyl halides, vinyl ethers and unsaturated sulfonic acids; (2) a Diels-Alder reaction adduct of an alpha,beta-unsaturated dicarboxylic acid anhydride and an olefin; and (3) an aromatic, aliphatic or alicyclic monocarboxylic or polycarboxylic acid anhydride.

2. The composition of claim 1 in which the compound having an acid anhydride group in the molecule as the deodorizing active component is a homopolymer of maleic anhydride.

3. The composition of claim 1 in which the compound having an acid anhydride group in the molecule as the deodorizing active component is a copolymer of maleic anhydride and an alpha-olefin.

4. The composition of claim 1 in which the compound having an acid anhydride group in the molecule as the deodorizing active component is the alpha,beta-unsaturated dicarboxylic acid anhydride polymer and has a molecular weight of from 500 to 500,000.

5. The composition of claim 1 in which the compound having an acid anhydride group in the molecule as the deodorizing active component is a Diels-Alder reaction product of an alpha,beta-unsaturated dicarboxylic acid anhydride and a diolefin.

6. The composition of claim 1 in which the compound having an acid anhydride group in the molecule as the deodorizing active component is an ene reaction product of an alpha,beta-unsaturated dicarboxylic acid anhydride and an olefin.

7. The composition of claim 5 or 6 in which the alpha,beta-unsaturated dicarboxylic acid anhydride is maleic anhydride.

8. The composition of claim 2 in which the maleic anhydride polymer has a molecular weight of 500 to 500,000.

9. The composition of claim 3 in which the copolymer of maleic anhydride and an alpha-olefin has a molecular weight of 500 to 500,000.

10. The composition of claim 1 in which the compound has at least 5 mole % of the acid anhydride group in the molecule.

* * * * *